(12) United States Patent
Greubel

(10) Patent No.: US 9,207,148 B2
(45) Date of Patent: Dec. 8, 2015

(54) COMBUSTOR FLAMEOUT DETECTION LOGIC

(71) Applicant: United Technologies Corporation, Hartford, CT (US)

(72) Inventor: Alan Greubel, San Diego, CA (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 0 days.

(21) Appl. No.: 14/242,214

(22) Filed: Apr. 1, 2014

(65) Prior Publication Data

US 2015/0300918 A1 Oct. 22, 2015

Related U.S. Application Data

(60) Provisional application No. 61/810,361, filed on Apr. 10, 2013.

(51) Int. Cl.
*G01M 15/10* (2006.01)

(52) U.S. Cl.
CPC .................................. *G01M 15/102* (2013.01)

(58) Field of Classification Search
CPC ......................... G01K 2205/04; G01M 15/102
See application file for complete search history.

(56) References Cited

U.S. PATENT DOCUMENTS 4,201,187 A * 5/1980 Skow ............................ 165/901

* cited by examiner

*Primary Examiner* — Laura Martin
*Assistant Examiner* — Alex Devito
(74) *Attorney, Agent, or Firm* — Miller, Matthias & Hull LLP

(57) ABSTRACT

A method for detecting a flame condition in a combustor of an engine is disclosed. The method may include detecting a temperature of an exhaust gas from the engine, and determining the flame condition in the combustor based on the detected temperature.

20 Claims, 4 Drawing Sheets

COMBUSTOR FLAMEOUT DETECTION LOGIC

FIELD OF THE DISCLOSURE

The present disclosure relates generally to gas turbine engines and, more particularly, to flameout detection systems and methods for a gas turbine engine.

BACKGROUND OF THE DISCLOSURE

Gas turbine engines may typically include a compressor, a combustor, and a turbine, with an annular flow path extending axially through each. Initially, air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate.

When the gas turbine engine is starting, the combustor may experience a flameout or weak flame event, such as a result of extreme environmental conditions. Typically, a flameout condition will become apparent through speed sensor feedback of engine deceleration or low acceleration. However, if the flameout condition occurs during an early phase of starting when the engine starter motor has enough torque to accelerate the gas turbine engine on its own, then the flameout may not be immediately recognized. During these circumstances, fuel continues to be introduced into the combustor. This could lead to excess fuel sprayed into the combustor or excess current drawn from the battery used to power the engine starter motor.

Accordingly, there exists a need for a system or method to quickly and reliably detect flame out or weak flame conditions. This invention is directed to solving this need and others.

SUMMARY OF THE DISCLOSURE

According to one exemplary embodiment of the present disclosure, a method for detecting a flame condition in a combustor of an engine is disclosed. The method may comprise detecting a temperature of an exhaust gas from the engine, and determining the flame condition in the combustor based on the detected temperature.

In a refinement, the method may further comprise comparing the detected temperature to a low threshold temperature and a high threshold temperature.

In another refinement, the method may further comprise comparing the detected temperature to an initial temperature of the exhaust gas before combustor ignition.

In another refinement, the method may further comprise determining a weak flame condition in the combustor if the detected temperature is less than the low threshold temperature, and if a previously detected temperature was greater than the initial temperature and greater than the high threshold temperature.

In yet another refinement, the method may further comprise determining a weak flame condition in the combustor if the detected temperature is less than the high threshold temperature and less than the initial temperature, and if a previously detected temperature was greater than the initial temperature.

According to another exemplary embodiment of the present disclosure, an automated method for detecting a flame condition in a combustor of an engine is disclosed. The automated method may comprise detecting a temperature of an exhaust gas from the engine; inputting a plurality of data into a computer processor, the plurality of data including the detected temperature, a low threshold temperature, and a high threshold temperature; and using the computer processor to determine at least one of a weak flame condition and a no flame condition based on the plurality of data.

In a refinement, the automated method may further comprise using the computer processor to compare the detected temperature to the low threshold temperature.

In another refinement, the automated method may further comprise using the computer processor to compare the detected temperature to the high threshold temperature.

In another refinement, the automated method may further comprise using the computer processor to determine the flame condition before the high threshold temperature is achieved.

In another refinement, the automated method may further comprise using the computer processor to determine the flame condition after the high threshold temperature is achieved.

In another refinement, the automated method may further comprise modifying at least one of the low threshold temperature and the high threshold temperature based on an exhaust gas temperature start profile of the engine.

In another refinement, the automated method may further comprise determining an occurrence of light-off in the combustor.

In another refinement, the automated method may further comprise determining an initial exhaust gas temperature, and using the computer processor to compare the detected temperature to the initial exhaust gas temperature.

In another refinement, the automated method may further comprise determining a nuisance fault based on the detected temperature and a speed of the engine.

In yet another refinement, the automated method may further comprise disabling the computer processor above a predetermined speed of the engine.

According to yet another exemplary embodiment of the present disclosure, a system for detecting a flameout condition in a combustor of an engine is disclosed. The system may comprise a sensor configured to detect a current exhaust gas temperature (EGT) of the engine, an input/output device receiving data from the sensor related to the current EGT, and a computer processor operatively connected to the input/output device, the computer processor configured to compare the current EGT to a low threshold temperature and a high threshold temperature in order to determine a flameout condition of the combustor.

In a refinement, the sensor may comprise an exhaust gas thermocouple, and the current EGT may be a real-time measurement of EGT of the engine.

In another refinement, the input/output device may receive data related to a comparison of the current EGT signal to an initial EGT signal, and the computer processor may be configured to use the data to determine the flameout condition.

In another refinement, the computer processor may be disabled when the engine reaches a predetermined speed.

In yet another refinement, the computer processor may be configured to determine the flameout condition before and after the high threshold temperature is reached.

These and other aspects and features of the disclosure will become more readily apparent upon reading the following detailed description when taken in conjunction with the accompanying drawings. Although various features are disclosed in relation to specific exemplary embodiments of the invention, it is understood that the various features may be combined with each other, or used alone, with any of the various exemplary embodiments of the invention without departing from the scope of the invention.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION

Figure 1:
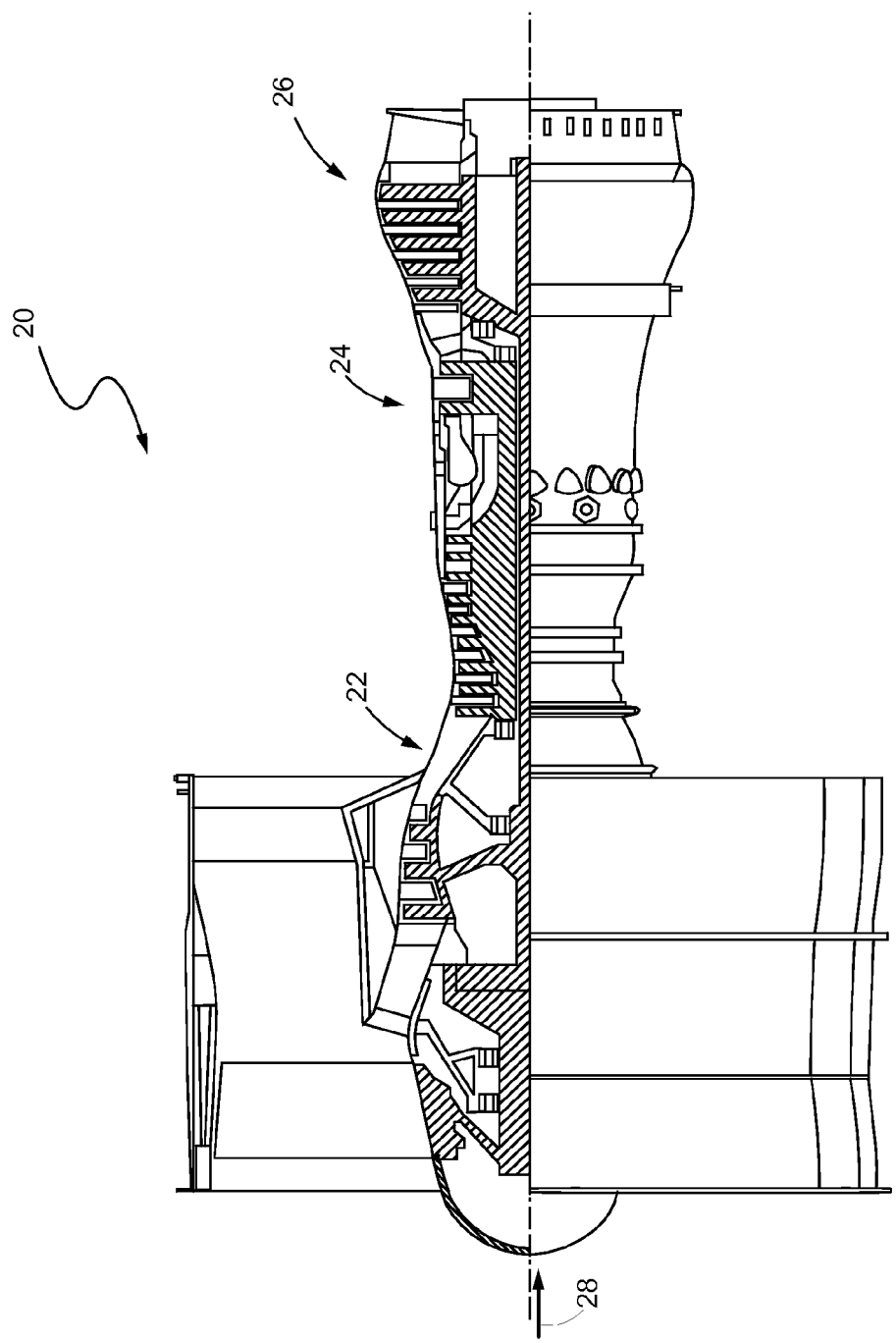
FIG. 1 is a cross-sectional view of a gas turbine engine constructed in accordance with the present disclosure.

Referring now to the drawings, and with specific reference to FIG. 1, in accordance with the teachings of the disclosure, an exemplary gas turbine engine 20 is shown. The gas turbine engine 20 may generally comprise a compressor section 22 where air is pressurized, a combustor 24 downstream of the compressor section which mixes and ignites the compressed air with fuel and thereby generates hot combustion gases, a turbine section 26 downstream of the combustor 24 for extracting power from the hot combustion gases, and an annular flow path 28 extending axially through each. The gas turbine engine 20 may be used on an aircraft for generating thrust or power, or in land-based operations for generating power as well.

Figure 2:
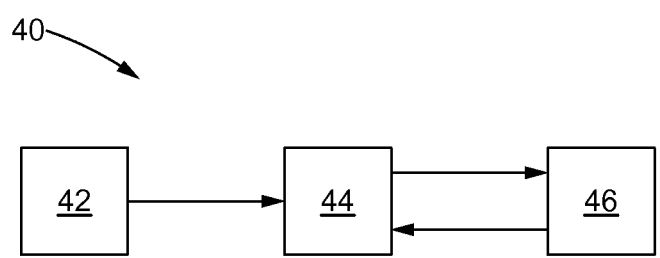
FIG. 2 is a schematic representation of a system for detecting a flame condition in a combustor of the gas turbine engine of FIG. 1, according to an exemplary embodiment of the present disclosure.

Turning now to FIG. 2, with continued reference to FIG. 1, a system 40 for detecting a flame condition in the combustor 24 of the gas turbine engine 20 is shown, according to an exemplary embodiment of the present disclosure. For example, the system 40 may detect a weak flame or flameout condition in the combustor 24. The system 40 may comprise at least one sensor 42, an input/output device 44 and any non-transitory computer readable storage medium, such as at least one computer processor 46. The sensor 42 may be configured to detect a current temperature of an exhaust gas, or exhaust gas temperature (EGT), from the gas turbine engine 20. The input/output device 44 may be operatively connected to the sensor 42 and may receive data related to the current EGT detected by the sensor 42. For example, the sensor may comprise an exhaust gas thermocouple which sends a real-time measurement of EGT to the input/output device 44. The computer processor 44 may be operatively connected to the input/output device 44 and may be configured to determine the flame condition in the combustor 24 based on the EGT detected by sensor 42.

Figure 3:
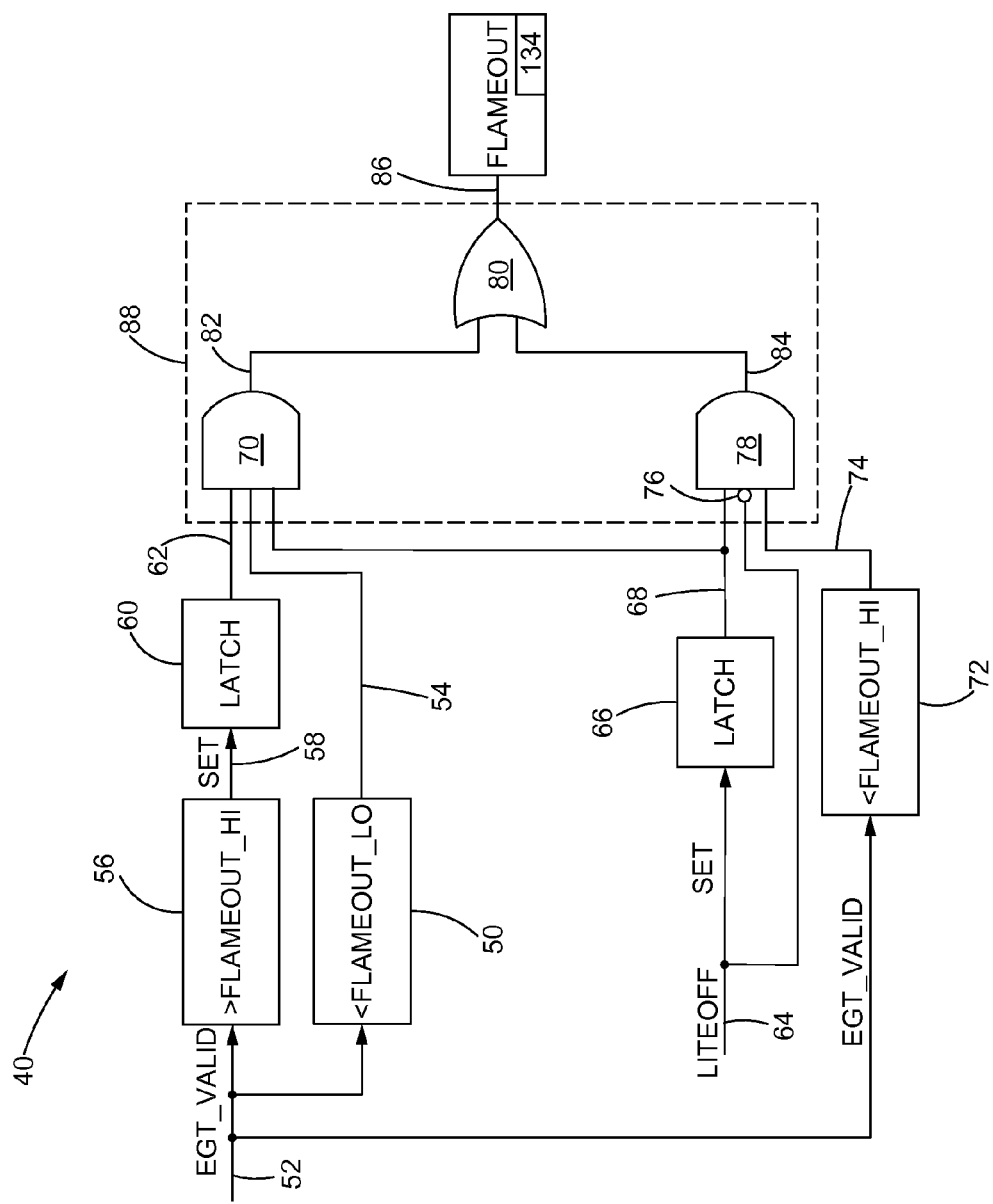
FIG. 3 is a schematic representation of an exemplary architecture of the system of FIG. 2.

Referring now to FIG. 3, with continued reference to FIGS. 1 and 2, a schematic representation of an exemplary architecture of the system 40 is shown, according to another exemplary embodiment of the present disclosure. For example, logic in the system 40 may be implemented at least in part via the computer processor 46. A current EGT signal may be generated based on the current EGT detected by sensor 42. A module 50 may receive the current EGT signal on a current EGT reference line 52. The module 50 may compare the current EGT to a low threshold temperature. For example, the low threshold temperature may be 450° F., although temperatures greater or less than 450° F. are certainly possible for the low threshold temperature. If the current EGT is less than the low threshold temperature, then the module 50 may send an output signal on reference line 54 as true. If the current EGT is greater than the low threshold temperature, then the module 50 may send the output signal on reference line 54 as false.

A module 56 may also receive the current EGT signal on the current EGT reference line 52. The module 56 may compare the current EGT to a high threshold temperature. For example, the high threshold temperature may be 500° F., although temperatures greater or less than 500° F. are certainly possible for the high threshold temperature. If the current EGT is greater than the high threshold temperature, then the module 56 may send an output signal on reference line 58 as true. If the current EGT is less than the high threshold temperature, then the module 56 may send the output signal on reference line 58 as false. A latch module 60 may receive the output signal from module 56 on reference line 58. If at any point the current EGT is greater than the high threshold temperature, then the output signal of true from module 56 on reference line 58 is sent to latch module 60, which may serve as a latch to set its output signal on reference line 62 as true until it is reset.

In addition, a light-off signal on reference line 64 may be generated based on an occurrence of light-off in the combustor, or a real-time calculation of whether the current EGT is greater than an initial EGT before combustor ignition. The light-off signal may also take into account a light-off threshold temperature. For example, the light-off signal may be generated based on a real-time calculation of whether the current EGT is greater than the initial EGT plus the light-off threshold temperature. The light-off threshold temperature may be 100° F., although temperatures greater or less than 100° F. are certainly possible for the light-off threshold temperature. If the current EGT is greater than the initial EGT plus the light-off threshold temperature, then the light-off signal on reference line 64 is true. If the current EGT is not greater than the initial EGT plus the light-off threshold temperature, then the light-off signal on reference line 64 is false. A latch module 66 may receive the light-off signal on reference line 64. If at any point the light-off signal is true, then the latch module 66 may set its output signal on reference line 68 as true until it is reset.

The system 40 may determine the flame condition in the combustor 24 after a strong flame has been achieved, such as, after the sensor 42 has detected an EGT greater than or equal to the high temperature threshold. The system 40 may detect a weak flame or flameout condition based on the signal from module 50 on reference line 54, the output signal from latch module 60 on reference line 62, and the output signal from latch module 66 on reference line 68. For example, as represented by an AND gate 70, if all the signals from reference lines 54, 62, and 68 are true, then the system 40 determines a weak flame or flameout condition in the combustor 24. More specifically, if the current EGT is less than the low threshold temperature (i.e. from reference line 54), if at any point the EGT was greater than the high threshold temperature (i.e. from reference line 62, a previously detected EGT before the current EGT was greater than the high threshold temperature), and if at any point the EGT was greater than the initial EGT plus the light-off threshold temperature (i.e. from reference line 68, a previously detected EGT before the current EGT was greater than the initial EGT plus the light-off threshold temperature), then the system AND gate 70 outputs a true signal on reference line 82.

The system 40 may also determine the flame condition in the combustor 24 before a strong flame has been achieved, such as, before the sensor 42 has detected an EGT greater than or equal to the high temperature threshold. For example, a module 72 may also receive the current EGT signal from reference line 52. The module 72 may compare the current EGT to the high threshold temperature. If the current EGT is less than the high threshold temperature, then the module 56 may send an output signal on reference line 74 as true. If the current EGT is greater than the high threshold temperature, then the module 72 may send the output signal on reference line 74 as false.

The system 40 may then detect a weak flame or flameout condition based on the signal from module 72 on reference line 74, the output signal from latch module 66 on reference line 68, and the light-off signal on reference line 64. The light-off signal on reference line 64 may be inverted by a NOT gate 76. As represented by an AND gate 78, if the signals from reference lines 68, 74 are true and the light-off signal on reference line 64 is false, then the system 40 determines a weak flame or flameout condition in the combustor 24. More specifically, if at any point the EGT was greater than the initial EGT plus the light-off threshold temperature (i.e. from reference line 68, a previously detected EGT before the current EGT was greater than the initial EGT plus the light-off threshold temperature), if the current EGT is less than the high threshold temperature (i.e. from reference line 74), and if the current EGT is less than the initial EGT plus some threshold (i.e. the inverted light-off signal on reference line 64 from NOT gate 76), then the AND gate outputs a true signal on reference line 84.

An OR gate 80 may receive output signals from AND gates 70, 78 on reference lines 82, 84. If either signal on reference line 82, 84 is true, then the OR gate outputs a true signal on reference line 86, and the system 40 determines a weak flame or flameout condition in the combustor 24 of the engine 20. The signal on reference line 86 determining the occurrence of a weak flame or flameout event may then be sent to a controller of the engine 20 and appropriate action may be taken, such as initiating a re-light process of the engine or stopping fuel supply to the combustor.

In addition, a nuisance fault may be declared based on the detected EGT in relation to a speed of the engine. For example, depending on how low the EGT decreases as the engine speed approaches its rated speed (i.e., 100% N), then there may be a nuisance fault. In this case, additional criteria may be applied to disable system 40 above a predetermined speed (such as 60% N). Above the predetermined speed, the weak flame/flameout condition would result in a deceleration of the engine, and traditional methods of deceleration automatic shutdown may be used to account for the combustor flameout. Furthermore, the high and low threshold temperatures may be modified and optimized depending on the engine and its typical EGT start profile, in order to maximize the quick response of the flameout detection system 40 while also minimizing the possibility of a nuisance fault.

It is to be understood that the configuration of modules and logic in FIG. 3 is only exemplary and that other configurations of modules and logic may certainly be used to detect combustor flame conditions. For example, the AND gates 70, 78 and OR gate 80 may be replaced by module 88 which is configured to perform the same function. Moreover, in other embodiments of the present disclosure, system 40 may function without light-off signal on reference line 64 or without module 56, latches 60, 66 and reference lines 62, 68. For example, system 40 may detect combustor flame conditions based only on the EGT or a comparison of the EGT to low and high threshold temperatures.

Figure 4:
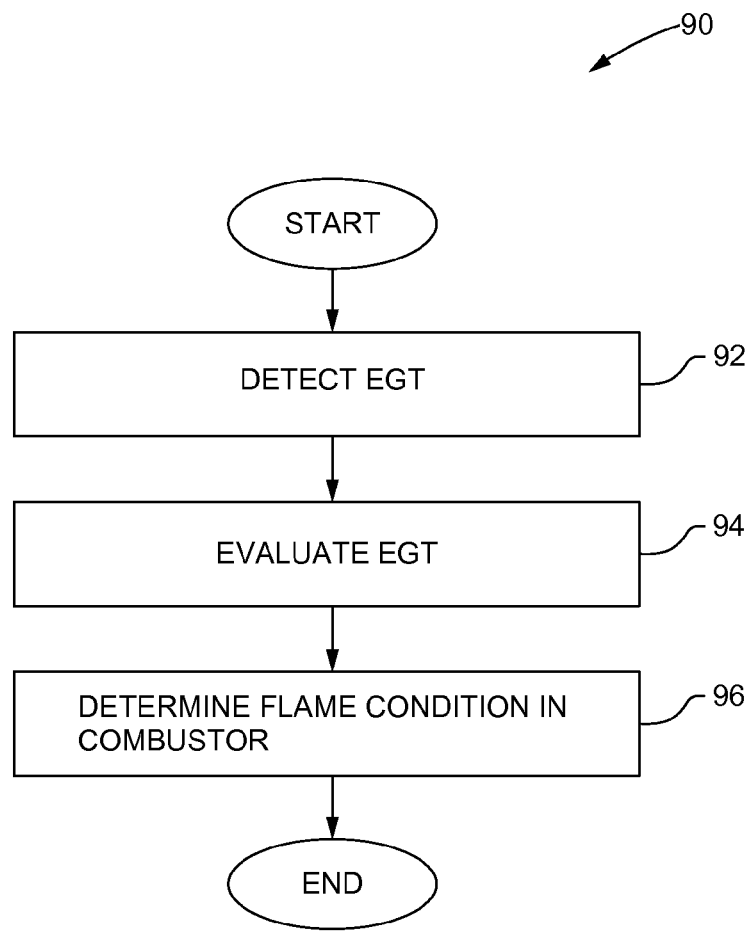
FIG. 4 is a flowchart outlining a method for detecting a flame condition in a combustor of a gas turbine engine, according to another exemplary embodiment of the present disclosure.

Referring now to FIG. 4, with continued reference to FIGS. 1-3, a flowchart outlining a method 90 for detecting the flame condition in the combustor 24 of the engine 20 is shown, according to yet another exemplary embodiment of the present disclosure. The system 40 may automatically implement all or part of method 90, as described above. At a first step 92, the current EGT from the engine 20 may be detected. At a next step 94, the detected EGT may be evaluated. For example, the detected EGT may be compared to the low threshold temperature, the high threshold temperature, and the initial EGT. Lastly, at a final step 96, the flame condition in the combustor 24 may be determined based on the evaluation of EGT from step 94. For example, a weak flame or flameout condition may be determined based on results from the comparison of the detected EGT to the low threshold temperature, the high threshold temperature and the initial EGT.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The present disclosure provides a system and method for detecting flame conditions in the combustor of a gas turbine engine. By detecting and evaluating the exhaust gas temperature of the engine, a weak flame or flameout condition in the combustor can be quickly and reliably determined. As a result, appropriate action can be swiftly taken to eliminate the entrance of excess fuel in the combustor or the excess current drawn from the engine start motor battery, thereby extending the life of the engine and its associated parts and reducing overall maintenance costs. Moreover, compared to the elaborate and expensive flameout detection systems of the prior art, the disclosed system and method provides a simple, reliable and cost-effective automated solution for early detection of weak flame/flameout conditions in the combustor.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed, but rather includes all embodiments and equivalents encompassed within the claims appended hereto as well.

What is claimed is:

1. A method for detecting a flame condition in a combustor of an engine, comprising:
    detecting a temperature of an exhaust gas from the engine;
    determining the flame condition in the combustor based on the detected temperature; and
    determining a nuisance fault based on the detected temperature and a speed of the engine.

2. The method of claim 1, further comprising comparing the detected temperature to a low threshold temperature and a high threshold temperature.

3. The method of claim 2, further comprising comparing the detected temperature to an initial temperature of the exhaust gas before combustor ignition.

4. The method of claim 3, further comprising determining a weak flame condition in the combustor if the detected temperature is less than the low threshold temperature, and if a previously detected temperature was greater than the initial temperature and greater than the high threshold temperature.

5. The method of claim 4, further comprising determining a weak flame condition in the combustor if the detected temperature is less than the high threshold temperature and less than the initial temperature, and if a previously detected temperature was greater than the initial temperature.

6. An automated method for detecting a flame condition in a combustor of an engine, comprising:
    detecting a temperature of an exhaust gas from the engine;
    inputting a plurality of data into a computer processor, the plurality of data including the detected temperature, a low threshold temperature, and a high threshold temperature;
    using the computer processor to determine at least one of a weak flame condition and a no flame condition based on the plurality of data; and
    determining a nuisance fault based on the detected temperature and a speed of the engine.

7. The automated method of claim 6, further comprising using the computer processor to compare the detected temperature to the low threshold temperature.

8. The automated method of claim 6, further comprising using the computer processor to compare the detected temperature to the high threshold temperature.

9. The automated method of claim 6, further comprising using the computer processor to determine the flame condition before the high threshold temperature is achieved.

10. The automated method of claim 6, further comprising using the computer processor to determine the flame condition after the high threshold temperature is achieved.

11. The automated method of claim 6, further comprising modifying at least one of the low threshold temperature and the high threshold temperature based on an exhaust gas temperature start profile of the engine.

12. The automated method of claim 6, further comprising determining an occurrence of light-off in the combustor.

13. The automated method of claim 6, further comprising determining an initial exhaust gas temperature, and using the computer processor to compare the detected temperature to the initial exhaust gas temperature.

14. The automated method of claim 6, further comprising disabling the computer processor above a predetermined speed of the engine.

15. A system for detecting a flameout condition in a combustor of an engine, comprising:
    a sensor configured to detect a current exhaust gas temperature (EGT) of the engine;
    an input/output device receiving data from the sensor related to the current EGT; and
    a computer processor operatively connected to the input/output device, the computer processor configured to compare the current EGT to a low threshold temperature and a high threshold temperature in order to determine a flameout condition of the combustor, the computer processor configured to determine a nuisance fault based on the current EGT and a speed of the engine.

16. The system of claim 15, wherein the sensor comprises an exhaust gas thermocouple, and wherein the current EGT is a real-time measurement of EGT of the engine.

17. The system of claim 15, wherein the input/output device receives data related to a comparison of the current EGT signal to an initial EGT signal, and wherein the computer processor is configured to use the data to determine the flameout condition.

18. The system of claim 15, wherein the computer processor is disabled when the engine reaches a predetermined speed.

19. The system of claim 15, wherein the computer processor is configured to determine the flameout condition before and after the high threshold temperature is reached.

20. The system of claim 12, further comprising comparing the detected temperature to a sum of an initial exhaust gas temperature and a light-off threshold temperature.

* * * * *